United States Patent
Takahara et al.

(10) Patent No.: US 9,970,342 B2
(45) Date of Patent: May 15, 2018

(54) EXHAUST GAS PURIFICATION DEVICE FOR INTERNAL COMBUSTION ENGINE

(71) Applicants: HONDA MOTOR CO., LTD., Tokyo (JP); MITSUI MINING & SMELTING CO., LTD., Tokyo (JP)

(72) Inventors: Ryosaku Takahara, Wako (JP); Koichi Inaba, Wako (JP); Nobuhiro Komatsu, Wako (JP); Masafumi Sakota, Wako (JP); Takahiro Kogawa, Ageo (JP); Michitaka Yamaguchi, Ageo (JP)

(73) Assignees: HONDA MOTOR CO., LTD., Tokyo (JP); MITSUI MINING & SMELTING CO., LTD., Tokyo (JP)

( * ) Notice: Subject to any disclaimer, the term of this patent is extended or adjusted under 35 U.S.C. 154(b) by 0 days. days.

(21) Appl. No.: 15/547,988

(22) PCT Filed: Jan. 29, 2016

(86) PCT No.: PCT/JP2016/052739
§ 371 (c)(1),
(2) Date: Aug. 1, 2017

(87) PCT Pub. No.: WO2016/125709
PCT Pub. Date: Aug. 11, 2016

(65) Prior Publication Data
US 2018/0023436 A1    Jan. 25, 2018

(30) Foreign Application Priority Data

Feb. 3, 2015 (JP) .................................. 2015-019583

(51) Int. Cl.
*F01N 3/10* (2006.01)
*F01N 3/08* (2006.01)
(Continued)

(52) U.S. Cl.
CPC ....... *F01N 3/0885* (2013.01); *B01D 53/9422* (2013.01); *B01D 53/96* (2013.01);
(Continued)

(58) Field of Classification Search
CPC ...... F01N 3/0885; F01N 3/023; F01N 3/0814; B01D 53/96; B01D 53/9422; B01D 2255/104
(Continued)

(56) References Cited

U.S. PATENT DOCUMENTS

| 5,972,829 A | * | 10/1999 | Ichimura | ............. B01J 23/8993 123/1 R |
| 2009/0120074 A1 | * | 5/2009 | Hirata | .................. B01D 53/944 60/297 |

(Continued)

FOREIGN PATENT DOCUMENTS

| EP | 2 659 968 A1 | 11/2013 |
| JP | 2005-090760 A | 4/2005 |

(Continued)

OTHER PUBLICATIONS ntemational Search Report dated Apr. 26, 2016, issued in counterpart International Application No. PCT/JP2016/052739 (3 pages).

*Primary Examiner* — Tom P Duong
(74) *Attorney, Agent, or Firm* — Westerman, Hattori, Daniels & Adrian, LLP

(57) ABSTRACT

An exhaust gas purification device is equipped with: an NOx purification unit disposed in exhaust gas piping of an engine supporting an NOx storage catalyst (NSC); a catalyzed soot filter (CSF) disposed downstream of the NOx purification unit supporting a particulate combustion catalyst causing captured particulates to combust; and an electronic control unit (ECU) which controls exhaust gas flowing into the NSC to be rich and which, by raising the temperature of the NSC,
(Continued)

acts as a regeneration device that causes sulfur components captured in the NSC to be desorbed. The particulate combustion catalyst is provided where Ag and Pd have been alloyed on an $Al_2O_3$ carrier; the quantity of Ag supported by the $Al_2O_3$ carrier is 1.2-2.5 g/L; the quantity of Pd supported by the $Al_2O_3$ carrier is 0.7 g/L or less; and the ratio Ag/Pd of the Ag support quantity to the Pd support quantity is 1.7-8.3.

1 Claim, 7 Drawing Sheets

(51) Int. Cl.
  *B01D 53/96*  (2006.01)
  *B01J 23/50*  (2006.01)
  *B01J 21/04*  (2006.01)
  *B01J 23/96*  (2006.01)
  *B01J 35/00*  (2006.01)
  *B01J 35/04*  (2006.01)
  *B01J 37/02*  (2006.01)
  *B01J 37/08*  (2006.01)
  *B01J 38/02*  (2006.01)
  *F01N 3/023*  (2006.01)
  *F01N 3/035*  (2006.01)
  *B01D 53/94*  (2006.01)

(52) U.S. Cl.
  CPC .............. *B01J 21/04* (2013.01); *B01J 23/50* (2013.01); *B01J 23/96* (2013.01); *B01J 35/0006* (2013.01); *B01J 35/04* (2013.01); *B01J 37/0213* (2013.01); *B01J 37/0236* (2013.01); *B01J 37/0248* (2013.01); *B01J 37/08* (2013.01); *B01J 38/02* (2013.01); *F01N 3/023* (2013.01); *F01N 3/035* (2013.01); *F01N 3/0814* (2013.01); *B01D 2255/104* (2013.01); *B01D 2255/1023* (2013.01); *B01D 2255/915* (2013.01)

(58) Field of Classification Search
  USPC ................... 422/171, 177, 180; 60/274, 300
  See application file for complete search history.

(56) References Cited

U.S. PATENT DOCUMENTS

| | | |
|---|---|---|
| 2009/0232714 A1 | 9/2009 | Abe et al. |
| 2010/0275584 A1* | 11/2010 | Wada ................. B01D 53/9495 60/285 |
| 2013/0101474 A1* | 4/2013 | Nakayama ............ F01N 3/0814 422/182 |
| 2016/0115835 A1 | 4/2016 | Daido et al. |

FOREIGN PATENT DOCUMENTS

| | | |
|---|---|---|
| JP | 2009-221913 A | 10/2009 |
| JP | 2010-223076 A | 10/2010 |
| JP | 2012-135742 A | 7/2012 |
| JP | 5524820 B2 | 6/2014 |
| NO | 2007/043442 A1 | 4/2007 |
| NO | 2014/189115 A1 | 11/2014 |

* cited by examiner

EXHAUST GAS PURIFICATION DEVICE FOR INTERNAL COMBUSTION ENGINE

TECHNICAL FIELD

The present invention relates to an exhaust gas purification device for an internal combustion engine. More specifically, the present invention relates to an exhaust gas purification device for an internal combustion engine which includes a NOx purification catalyst and a particulate combustion catalyst.

BACKGROUND ART

In recent, years, as a typical exhaust, gas purification device that is applied to a compression ignition-type internal combustion engine (hereinafter referred to as the "engine"), a device has been known that includes a NOx purification catalyst (hereinafter referred to as the "NSC") and a catalyzed soot filter (hereinafter referred to as the "CSF") on which a particulate combustion catalyst is supported. In this device, the NSC is provided in an exhaust passage immediately below the engine, and the CSF is provided in an exhaust passage on the downstream side of the NSC.

Here, the NSC oxidizes and purifies CO and HC contained in exhaust gas, captures NOx when the exhaust gas is lean, then enriches the captured NOx so as to perform desorption and reduces and purifies the exhaust gas to $N_2$. The CSF captures particulates contained in the exhaust gas, and oxidizes and purifies the captured particulates with a particulate combustion catalyst.

As the particulate combustion catalyst described above, a particulate combustion catalyst is proposed in which an alloy formed with 75 to 25 mass % of Ag and 25 to 75 mass % of Pd is supported on an $Al_2O_3$ carrier (see, for example, Patent Document 1). It is thought that with the particulate combustion catalyst described above, regardless of the concentration of NOx in exhaust gas, it is possible to oxidize and purify particulates.

Patent Document 1: Japanese Patent No. 5524820

DISCLOSURE OF THE INVENTION

Problems to be Solved by the Invention

Incidentally, it is known that precious metals such as Pt in an NSC are poisoned by a small amount of sulfur component (hereinafter referred to as the "S component") such as SOx which is contained in exhaust, gas, and that thus purification performance is lowered. Hence, so-called sulfur purge (hereinafter referred to as "S purge") is performed in which the NSC is heated to about 500 to 600° C., and in which the exhaust gas is enriched such that, the S component is desorbed from the precious metals. Here, the desorbed S component reacts with hydrogen generated by a steam reforming reaction that is made to proceed by the enrichment, and thus hydrogen sulfide ($H_2S$) is generated. Since the generated hydrogen sulfide $H_2S$ has a specific smell which causes a bad smell, it is required to purify such a smell.

However, in the particulate combustion catalyst, of Patent Document 1, the purification of $H_2S$ is not examined at all. Moreover, large amounts of expensive precious metals are used, and this results in a high cost. Hence, it is desired to develop an exhaust gas purification device that includes an inexpensive particulate combustion catalyst which has excellent purification performance both for particulates and $H_2S$.

The present invention is made in view of the foregoing, and an object thereof is to provide an exhaust gas purification device that includes an inexpensive particulate combustion catalyst which has excellent purification performance both for particulates and $H_2S$.

Means for Solving the Problems

In order to achieve the above object, the present invention provides an exhaust gas purification device (for example, an exhaust gas purification device 1 which will be described later) for an internal combustion engine (for example, an engine 2 which will be described later), the exhaust gas purification device including: a NOx purification unit (for example, a NOx purification unit 4 which will be described later) on which a NOx purification catalyst that is provided in an exhaust passage (for example, an exhaust gas pipe 3 which will be described later) of the internal combustion engine, that captures, when exhaust gas flowing in is lean, NOx in the exhaust gas and that desorbs the captured NOx when the exhaust gas flowing in is rich so as to reduce and purify the exhaust gas is supported; an exhaust gas purification filter (for example, a CSF 5 which will be described later) on which a particulate combustion catalyst that, is provided in the exhaust passage on a downstream side of the NOx purification unit, that, captures a particulate in the exhaust gas flowing in and that burns the captured particulate is supported; and a reproduction means (for example, an ECU 7 which will be described later) which performs control so as to enrich the exhaust gas flowing into the NOx purification catalyst and which heats the NOx purification catalyst to a predetermined temperature (for example, 500 to 600° C.) so as to desorb a sulfur component captured by the NOx purification catalyst, where the particulate combustion catalyst is supported on an $Al_2O_3$ carrier in a state where Ag and Pd are alloyed, the amount of Ag supported on the $Al_2O_3$ carrier is 1.2 to 2.5 g/L, the amount of Pd supported on the $Al_2O_3$ carrier is equal to or less than 0.7 g/L and a ratio Ag/Pd of the amount, of Ag supported to the amount of Pd supported is 1.7 to 8.3.

In the exhaust gas purification device for the internal combustion engine according to the present invention, the NOx purification unit which includes the NOx purification catalyst in the exhaust passage on the upstream side is provided, the exhaust gas purification filter which includes the particulate combustion catalyst in the exhaust passage on the downstream side thereof is provided and the reproduction means which performs control so as to enrich the exhaust gas flowing into the NOx purification catalyst and which heats the NOx purification catalyst to the predetermined temperature so as to desorb the sulfur component captured by the NOx purification catalyst is provided. In the particulate combustion catalyst, the alloy formed with Ag and Pd is supported on the $Al_2O_3$ carrier, the amount of Ag supported is set to 1.2 to 2.5 g/L, the amount of Pd supported is set equal to or less than 0.7 g/L and the ratio Ag/Pd of the amount of Ag supported to the amount of Pd supported is set to 1.7 to 8.3. In the exhaust gas purification device for the internal combustion engine according to the present invention, the amount of Ag supported and the amount of Pd supported in the particulate combustion catalyst are made to fall within the ranges described above, and thus it is possible to obtain excellent particulate purification performance while reducing the cost. The ratio of the amount of Pd supported to the amount of Ag supported in the particulate combustion catalyst is made to fall within the range described above, and thus it is possible to efficiently capture $H_2S$ generated under a rich atmosphere on the upstream side mainly by change of Ag into a sulfide or a sulfate while reducing the cost. Furthermore, the desorption of the S component from the sulfide or the sulfate of Ag generated by the capturing of $H_2S$ can be promoted by Pd. Hence, with the exhaust gas purification device for the internal combustion engine according to the present invention, it is possible to obtain excellent purification performance both for particulates and $H_2S$ while reducing the cost.

Effects of the Invention

According to the present invention, it is possible to provide an exhaust gas purification device that includes an inexpensive particulate combustion catalyst which has excellent purification performance both for particulates and $H_2S$.

PREFERRED MODE FOR CARRYING OUT THE INVENTION

An embodiment of the present invention will be described below with reference to drawings.

Figure 1:
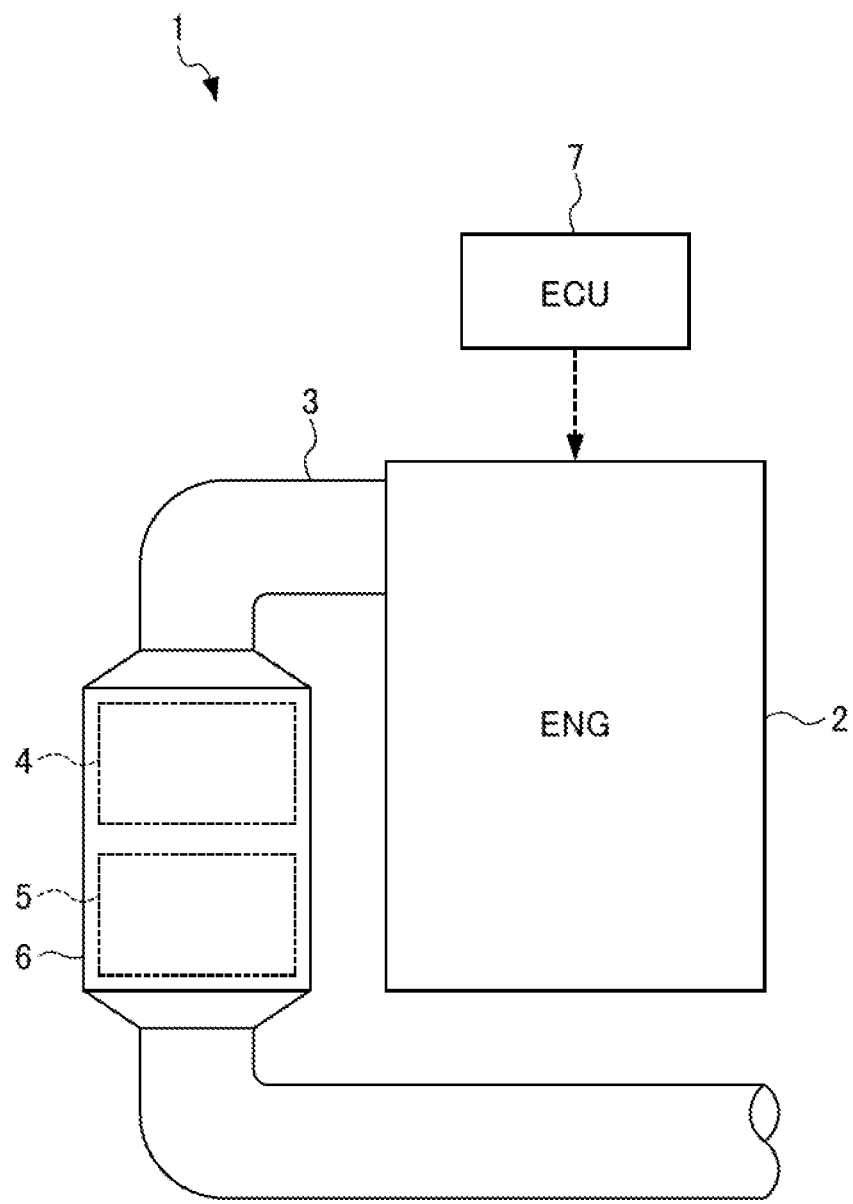
FIG. 1 is a diagram showing an example of an exhaust gas purification device which includes a particulate combustion catalyst according to an embodiment of the present invention.

FIG. 1 is a diagram showing an example of an exhaust gas purification device 1 which includes a particulate (hereinafter referred to as "PM") combustion catalyst according to the present embodiment. As shown in FIG. 1, the exhaust gas purification device 1 includes: a NOx purification unit 4 which is provided in an exhaust gas pipe 3 immediately below an engine 2; a CSF 5 which is provided on the downstream side of the NOx purification unit 4; and an ECU 7. The NOx purification unit 4 and the CSF 5 are stored in a single casing 6. The PM combustion catalyst according to the present embodiment is supported on the CSF 5.

The engine 2 is a diesel engine. In exhaust gas discharged from the diesel engine, not only CO and HC but also large amounts of NOx and PMs are contained. The exhaust, gas purification device 1 efficiently purifies CO, HC, NOx and PMs described above.

The NOx purification unit 4 is formed by supporting an NSC on a honeycomb carrier. Hence, the NOx purification unit 4 oxidizes and purifies CO and HC contained in the exhaust gas. The NOx purification unit 4 also captures NOx when the exhaust gas is lean, then enriches the exhaust gas so as to desorb the captured NOx and reduces and purifies the exhaust gas to $N_2$. As the NSC of the NOx purification unit 4, for example, a conventionally known NSC containing precious metals such as Pt is used.

The precious metals such as Pt contained in the NSC capture NOx and simultaneously capture a small amount of S component such as SOx contained in the exhaust gas. Hence, the precious metals are poisoned by the S component, and thus purification performance for NOx and the like is lowered. Since the absorbability of the S component on the NSC is higher than that of Nox, the NSC is heated to a high temperature of 500 to 600° C., and S purge for enriching the exhaust gas is performed. In this way, the S component is desorbed from the precious metals. Here, the desorbed S component reacts with hydrogen generated by a steam reforming reaction that is made to proceed by the enrichment, and thus hydrogen sulfide ($H_2S$) is generated. The generated $H_2S$ flows into the CSF 5 which is provided on the downstream side of the NSC and which will be described later.

Here, the S purge described above is performed by the ECU 7 which is formed so as to include a reproduction portion serving as a reproduction means. The ECU 7 includes: an input circuit which has, for example, the functions of shaping input signal waveforms from various types of sensors unillustrated, correcting a voltage level to a predetermined level and converting an analogue signal value into a digital signal value; and a central processing unit (hereinafter referred to as the "CPU"). In addition, the ECU 7 includes: a storage circuit, which stores various types of computation programs performed by the CPU, the results of the computations and the like; and an output circuit which outputs control signals to the engine 2 and the like. The ECU 7 performs the S purge by heating the NSC constituting the NOx purification unit 4 to a high temperature of 500 to 600° C. and enriching the exhaust gas flowing into the NSC. Specifically, the ECU 7 performs any one of combustion rich in which an air-fuel ratio within a combustion chamber is enriched by fuel injection control such that the exhaust gas is enriched, post rich in which an unburned fuel is supplied into a combustion chamber after combustion and the exhaust gas pipe 3 such that the exhaust gas is enriched and exhaust rich in which a fuel is directly injected into the exhaust gas pipe 3 such that the exhaust gas is enriched, and thereby enriches the exhaust gas and also increases the temperature of the NSC by heating caused by a proceeding oxidation reaction of the NSC.

The CSF 5 captures the PMs contained in the exhaust gas. The CSF 5 is formed by supporting the PM combustion catalyst of the present embodiment on a diesel particulate filter (hereinafter referred to as the "DPF"). As the DPF, a conventionally known DPF is used. For example, the DPFs of a wall-through type, a flow-through honeycomb type, a wire mesh type, a ceramic fiber type, a metal porous type, a particle filled type and a foam type can be used. Examples of the material of the base member of the DPF include cordierite, ceramic such as SiC, an Fe—Cr—Al alloy and a stainless steel alloy.

The PM combustion catalyst according to the present embodiment has the function of burning the PMs so as to perform oxidization and purification and also has the function of oxidizing and purifying $H_2S$. The PM combustion catalyst according to the present embodiment is formed by being supported on an $Al_2O_3$ carrier in a state where Ag and Pd are alloyed. The PM combustion catalyst according to the present embodiment will be described in detail below.

The carrier of the PM combustion catalyst according to the present embodiment is formed of $Al_2O_3$. $Al_2O_3$ is excellent in heat resistance, pores thereof are prevented from being collapsed even at a high temperature and a decrease in specific surface area is reduced. Hence, in the PM combustion catalyst according to the present embodiment, a catalyst metal formed with an alloy of Ag and Pd which are active species is prevented from being embedded, and thus high purification performance is maintained even at a high temperature.

As $Al_2O_3$, various types of $Al_2O_3$ such as $\alpha$-$Al_2O_3$, $\gamma$-$Al_2O_3$ and $\theta$-$Al_2O_3$ are used. The specific surface area of $Al_2O_3$ is preferably 80 to 160 $m^2/g$.

On the surface of the $Al_2O_3$ carrier, a binder layer formed of a binder component such as $SiO_2$, $TiO_2$, $ZrO_2$ or $Al_2O_3$ is preferably provided. The binder layer is provided on the surface of the $Al_2O_3$ carrier, and thus the adhesion of the base member constituting the DPF and the PM combustion catalyst is enhanced, and the durability and heat resistance of the PM combustion catalyst are enhanced.

Ag acts as a main active species for the combustion of the PMs. Here, the melting point of Ag is low, and this causes the aggregation of the PM combustion catalyst at a high temperature. By contrast, the PM combustion catalyst of the present embodiment has the catalyst metal in which Ag and Pd are alloyed, and thus the catalyst metal has a higher melting point than Ag in a pure metal state, with the result that aggregation thereof at a high temperature is prevented. In other words, the PM combustion catalyst of the present embodiment has high heat resistance, and thus excellent PM purification performance is maintained even at a high temperature.

As with Ag, Pd acts as an active species for the combustion of the PMs. As described above, Pd is alloyed with Ag, and thus the heat resistance of the PM combustion catalyst according to the present embodiment is enhanced. Here, whether or not Ag and Pd are alloyed can be checked by performing an X-ray diffraction measurement on the PM combustion catalyst according to the present embodiment, and analyzing an X-ray diffraction spectrum obtained. Specifically, when in the X-ray diffraction spectrum obtained by the measurement, a peak is found in a position shifted to the side of a slightly higher angle than an X-ray diffraction peak derived from Ag in the pure metal state, it is possible to determine that such a peak is a peak which is derived from Ag alloyed, and that Ag and Pd are alloyed (see FIG. 8 which will be described later). The "peak is found in a position shifted to the side of a slightly higher angle" described above means that in the X-ray diffraction spectrum of the PM combustion catalyst according to the present embodiment, a peak is found in a position which is shifted to the side of a higher angle than the X-ray diffraction peak derived from Ag in the pure metal state by 0.1 degrees or more.

Figure 2:
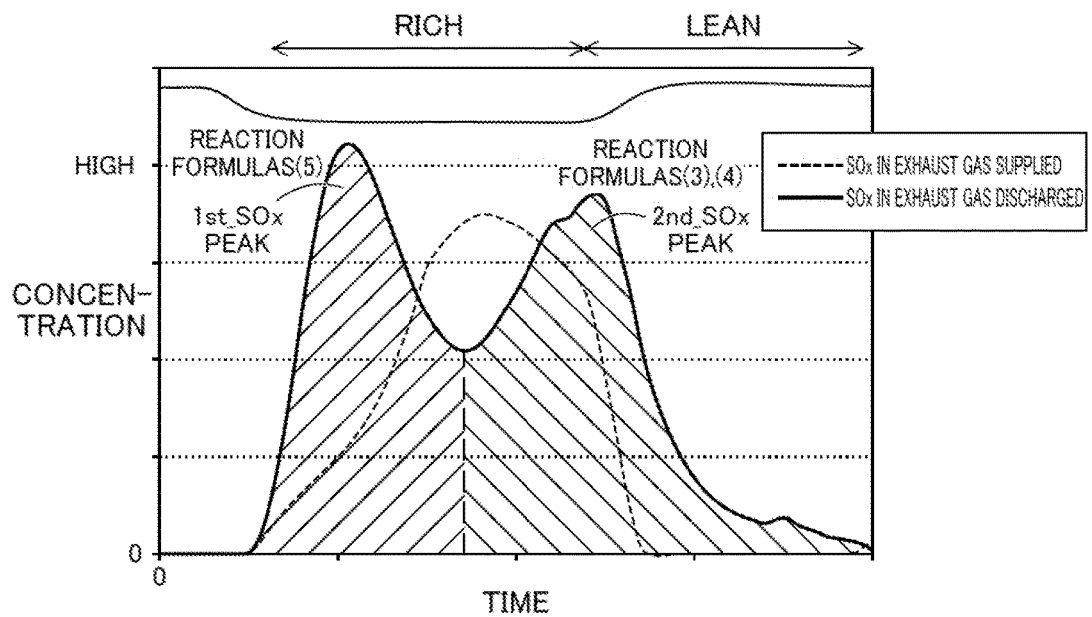
FIG. 2 is a diagram showing a relationship between the concentration of SOx in exhaust gas supplied to the particulate combustion catalyst according to the present embodiment and the concentration of SOx in the exhaust gas discharged from the particulate combustion catalyst, according to the present embodiment.
Figure 3:
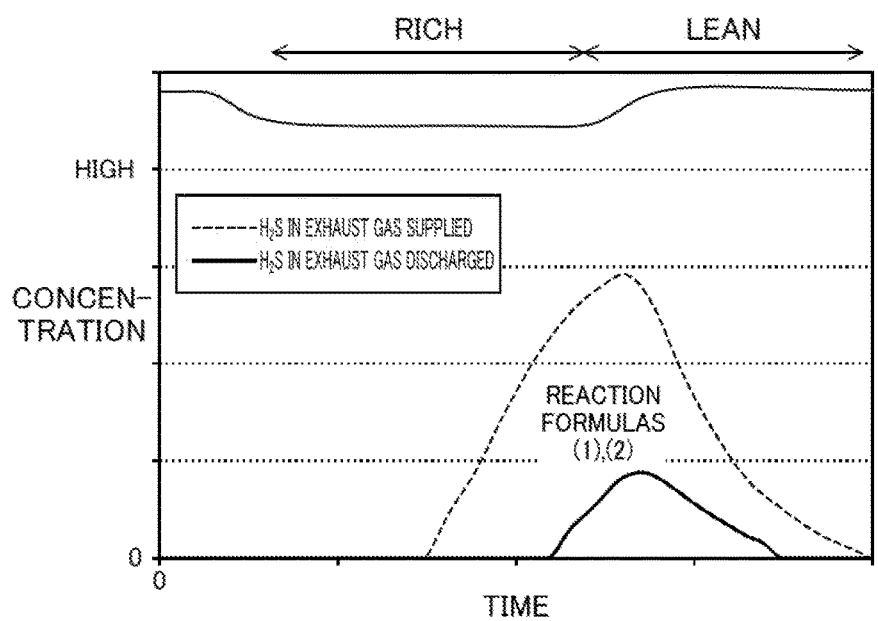
FIG. 3 is a diagram showing a relationship between the concentration of $H_2S$ in the exhaust gas supplied to the particulate combustion catalyst, according to the present embodiment and the concentration of $H_2S$ in the exhaust gas discharged from the particulate combustion catalyst, according to the present embodiment.

As described above, the PM combustion catalyst of the present embodiment including the catalyst metal formed with an alloy of Ag and Pd has an action for purifying $H_2S$. The $H_2S$ purification action of the PM combustion catalyst according to the present embodiment will be described in further detail below with reference to reaction formulas (1) to (5) below and FIGS. 2 and 3. Here, FIG. 2 is a diagram showing a relationship between the concentration of SOx in the exhaust gas supplied to the PM combustion catalyst of the present embodiment and the concentration of SOx in the exhaust gas discharged from the PM combustion catalyst of the present embodiment. FIG. 3 is a diagram showing a relationship between the concentration of $H_2S$ in the exhaust gas supplied to the PM combustion catalyst of the present embodiment, and the concentration of $H_2S$ in the exhaust gas discharged from the PM combustion catalyst of the present embodiment. In FIGS. 2 and 3, as an example of the PM combustion catalyst according to the present embodiment, a PM combustion catalyst in which the amount of Ag supported is 2.5 g/L and in which the amount of Pd supported is 0.7 g/L is used, and measurement data when the S purge is performed on the NSC on the upstream side is shown.

When the S purge is first performed on the NSC so as to enrich the exhaust gas under a high temperature, as described above, $H_2S$ generated by the reaction of the S component desorbed from the MSG and the hydrogen generated by the steam reforming reaction that is made to proceed by the enrichment flows into the PM combustion catalyst of the present embodiment which is supported on the CSF 5. Then, as indicated in reaction formula (1), Ag mainly adsorbs $H_2S$ so as to form into a sulfide ($Ag_2S$), and thus the S component is captured. At the same time, as indicated in reaction formula (2), Pd also adsorbs an extremely smaller amount of $H_2S$ than Ag, as will be described in detail later, so as to form into a sulfide (PdS), and thus the S component is captured.

[Chem. 1]

(Rich)

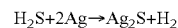     reaction formula (1)

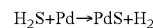     reaction formula (2)

The concentration of $H_2S$ in the exhaust gas at this time is as shown in FIG. 3. In other words, it is found that as compared with the concentration of $H_2S$ (broken line in FIG. 3) in the exhaust gas supplied to the PM combustion catalyst, the concentration of $H_2S$ (solid line in FIG. 3) in the exhaust gas discharged from the PM combustion catalyst is significantly reduced. Hence, it is found that reaction formulas (1) and (2) described above proceed such that $H_2S$ in the exhaust gas is captured by Ag and Pd.

Here, Ag and Pd have higher ionization tendencies than other precious metals such as Pt and Rh. Hence, the catalyst metal of the present embodiment formed with an alloy of Ag and Pd has the property of easily generating a sulfide as compared with other precious metals such as Pt and Rh or alloys thereof. Hence, the catalyst metal of the present embodiment formed with an alloy of Ag and Pd efficiently captures $H_2S$ and thereby has excellent $H_2S$ purification performance.

Then, when the exhaust gas is changed from rich to lean, a large amount of $O_2$ contained in the exhaust gas reacts with the sulfide $Ag_2S$, and thus as indicated in reaction formula (3-1), the sulfide $Ag_2S$ is converted into a sulfate $Ag_2SO_4$, and as indicated in reaction formula (3-2), $SO_2$ is desorbed from the sulfide $Ag_2S$, with the result that Ag is generated. A reaction rate between reaction formula (3-1) and reaction formula (3-2) is varied depending on an oxygen partial pressure, a temperature and the like. At the same time, as indicated in reaction formula (4), a large amount of $O_2$ contained in the exhaust gas reacts with the sulfide PdS, thus $SO_2$ is desorbed from the sulfide PdS and the sulfide PdS is converted into Pd so as to return to the original state. In this way, $H_2S$ can be captured again by Pd.

[Chem. 2]

(Rich→lean)

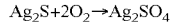
$Ag_2S + 2O_2 \rightarrow Ag_2SO_4$     reaction formula (3-1)

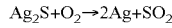
$Ag_2S + O_2 \rightarrow 2Ag + SO_2$     reaction formula (3-2)

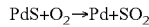
$PdS + O_2 \rightarrow Pd + SO_2$     reaction formula (4)

The concentration of SOx in the exhaust gas at this time is as shown in FIG. 2. Specifically, it is found that the concentration of SOx (solid line in FIG. 2) in the exhaust gas discharged from the PM combustion catalyst is significantly increased (see 2nd_SOx peak in FIG. 2). Hence, it is found that reaction formulas (3) and (4) described above proceed, and that thus SOx is desorbed from the sulfides $Ag_2S$ and PdS.

Then, when the exhaust gas is changed from lean to rich, as indicated in reaction formula (5), SOx is desorbed from the sulfate $Ag_2SO_4$, and the sulfate $Ag_2SO_4$ is converted into Ag so as to return to the original state. In this way, $H_2S$ can be captured again by Ag.

[Chem. 3]

(Lean→rich)

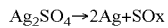
$Ag_2SO_4 \rightarrow 2Ag + SOx$     reaction formula (5)

The concentration of SOx in the exhaust gas at this time is as shown in FIG. 2. Specifically, it is found that the concentration of SOx (solid line in FIG. 2) in the exhaust gas discharged from the PM combustion catalyst is significantly increased (see 1nd_SOx peak in FIG. 2). Hence, it is found that reaction formula (5) described above proceeds, and that thus SOx is desorbed from the sulfate $Ag_2SO_4$.

In the PM combustion catalyst according to the present embodiment, as the lean/rich control on the exhaust gas is performed, reaction formulas (1) to (5) described above proceed repeatedly. In this way, with the PM combustion catalyst according to the present, embodiment, it is possible to purify $H_2S$.

Figure 4:
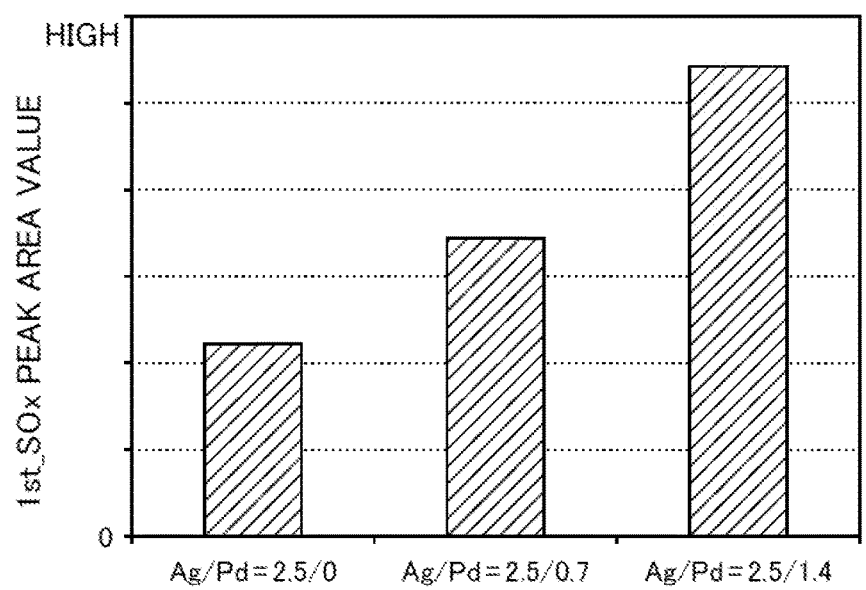
FIG. 4 is a diagram showing variations in 1st_SOx peak area value when in the particulate combustion catalyst according to the present embodiment, the amount of Ag supported is varied.

Here, FIG. 4 is a diagram showing variations in 1st_SOx peak area value when in the PM combustion catalyst according to the present embodiment, the amount, of Ag supported is fixed to 2.5 g/L and the amount of Pd supported is varied in three stages from 0 to 0.7 and then to 1.4 g/L. As is clear from FIG. 4, it is found that, as the ratio of Pd to Ag is increased, the 1st_SOx peak area value is increased. Hence, in the PM combustion catalyst of the present embodiment, Pd promotes the proceeding of reaction formula (5) described above so as to promote the desorption of SOx from $Ag_2SO_4$.

Figure 5:
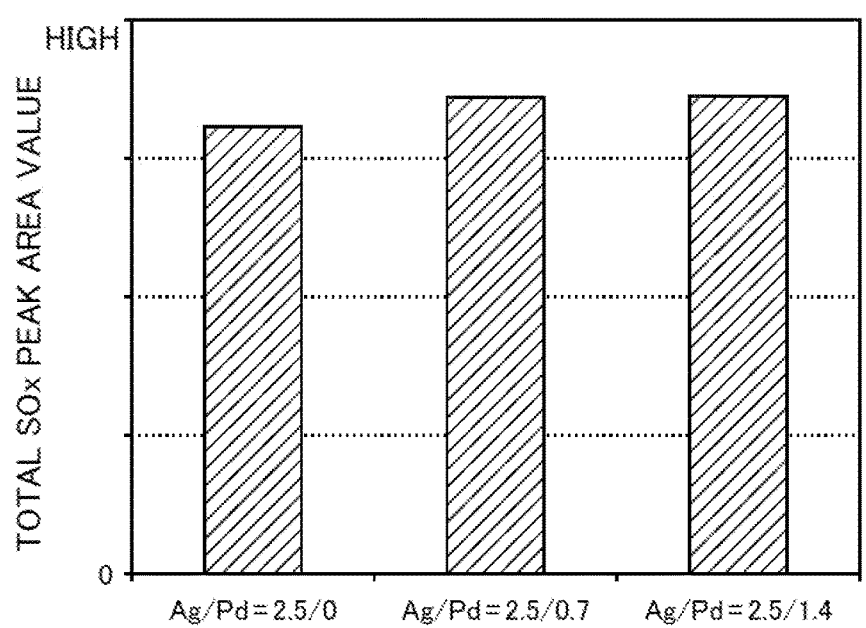
FIG. 5 is a diagram showing variations in total SOx peak area value when in the particulate combustion catalyst according to the present embodiment, the amount of Ag supported is varied.

FIG. 5 is a diagram showing variations in the total value (total SOx peak area value) of the 1st_SOx peak area value and a 2nd_SOx peak area value when in the PM combustion catalyst according to the present embodiment, the amount of Ag supported is fixed to 2.5 g/L and the amount of Pd supported is varied in three stages from 0 to 0.7 and then to 1.4 g/L. As is clear from FIG. 5, it is found that even when the ratio of Pd to Ag is increased, the total SOx peak area value is not significantly changed. Thus, it is found that in the PM combustion catalyst of the present embodiment, an extremely small amount of $H_2S$ is adsorbed by Pd, and that $H_2S$ is mainly adsorbed and captured by Ag.

Hence, in the PM combustion catalyst, according to the present embodiment, Ag adsorbs $H_2S$ so as to form into $Ag_2SO_4$ through $Ag_2S$, and thus S component is captured. Pd promotes the desorption of SOx from $Ag_2SO_4$, and thus the S component is purified. In this way, the purification of $H_2S$ is completed.

The Ag supported amount and the Pd supported amount in the PM combustion catalyst of the present embodiment will then be described in detail. In the present embodiment, the amount of Ag supported on the $Al_2O_3$ carrier (hereinafter referred to as the "Ag supported amount") is 1.2 to 2.5 g/L. When the Ag supported amount falls within this range, it is possible to obtain excellent PM purification performance. By contrast, when the Ag supported amount is less than 1.2 g/L, sufficient PM purification performance cannot be obtained. Even when the Ag supported amount exceeds 2.5 g/L, a further effect cannot be obtained, and thus the cost is increased.

The amount of Pd supported on the $Al_2O_3$ carrier (hereinafter referred to as the "Pd supported amount") is equal to or less than 0.7 g/L. When the Pd supported amount falls within this range, it is possible to obtain excellent PM purification performance. By contrast, even when the Pd supported amount exceeds 0.7 g/l, a further effect cannot be obtained, and thus the cost is increased. The unit (g/L) in the present specification means a weight per unit volume. Hence, the Ag supported amount means the weight of Ag per unit volume of the $Al_2O_3$ carrier, and the Pd supported amount means the weight of Pd per unit volume of the $Al_2O_3$ carrier.

Figure 6:
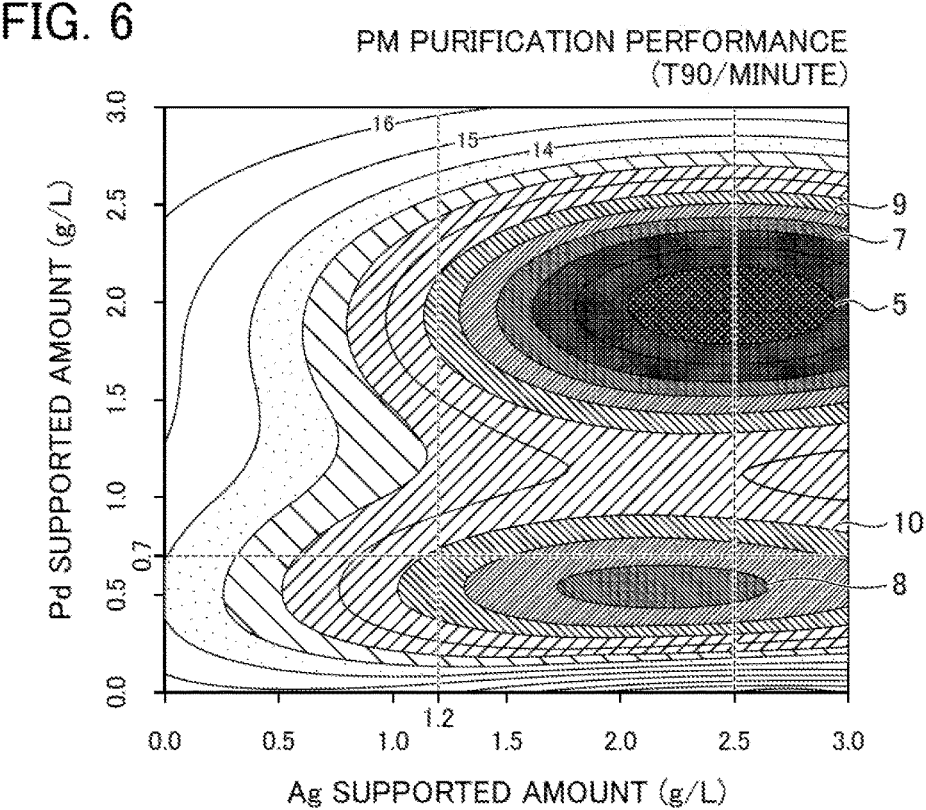
FIG. 6 is a diagram showing a relationship between an Ag supported amount and a Pd supported amount obtained by statistical analysis processing and particulate purification performance (T90/minute)

FIG. 6 is a diagram showing a relationship between the Ag supported amount and the Pd supported amount obtained by statistical analysis processing and the PM purification performance (T90/minute). Here, T90 indicates a time (minute) necessary for reaching a PM combustion rate of 90%. In other words, it is meant that as T90 is decreased, the PM purification performance is higher. Values in FIG. 6 indicate T90 (minute), and it is meant that as the region is more highly colored, T90 is decreased, and thus the PM purification performance is higher.

It is found that as shown in FIG. 6, in a region specified in the present embodiment where the Ag supported amount is 1.2 to 2.5 g/L and where the Pd supported amount is equal to or less than 0.7 g/L, T90 is low and high PM purification performance can be obtained. In FIG. 6, even when the Pd supported amount is around 2.0 g/L, there is also a region where the T90 is low and high PM purification performance can be obtained. However, although in this region, high PM purification performance can be obtained, it is necessary to use a large amount of Pd, with the result that the cost is increased. By contrast, in the region specified in the present embodiment, high PM purification performance can be obtained while the cost is being reduced.

In the present embodiment, the ratio Ag/Pd (hereinafter referred to as the "Ag/Pd ratio") of the Ag supported amount to the Pd supported amount is 1.7 to 8.3. When the Ag/Pd ratio falls within this range, excellent $H_2S$ purification performance can be obtained while the cost is being reduced. By contrast, when the Ag/Pd ratio is less than 1.7, though excellent $H_2S$ purification performance can be obtained, it is necessary to use a large amount of Pd, with the result that the cost is increased. When the Ag/Pd ratio exceeds 8.3, it is impossible to expect a further enhanced $H_2S$ purification performance, and it is also impossible to obtain excellent PM purification performance.

Here, when the Ag/Pd ratio is 1.7, the $H_2S$ purification performance itself is maximized. This is considered to be for the following reason. Specifically, as described previously, the purification of $H_2S$ in the present embodiment is performed by a method in which Ag adsorbs $H_2S$ so as to form into $Ag_2SO_4$ through $Ag_2S$, in which thus the S component is captured and in which Pd promotes the desorption of SOx from $Ag_2SO_4$. Hence, in order to adsorb $H_2S$, Ag needs to be exposed to the surface of the catalyst to some extent, and Pd also needs to be exposed to the surface of the catalyst to some extent and be in the vicinity of Ag. Hence, the balance of the presence of Ag and Pd on the surface of the catalyst is important, and it can be considered that when the Ag/Pd ratio is 1.7, the balance of the presence of Ag and Pd on the surface of the catalyst, is optimized, and consequently, the $H_2S$ purification performance is maximized.

Figure 7:
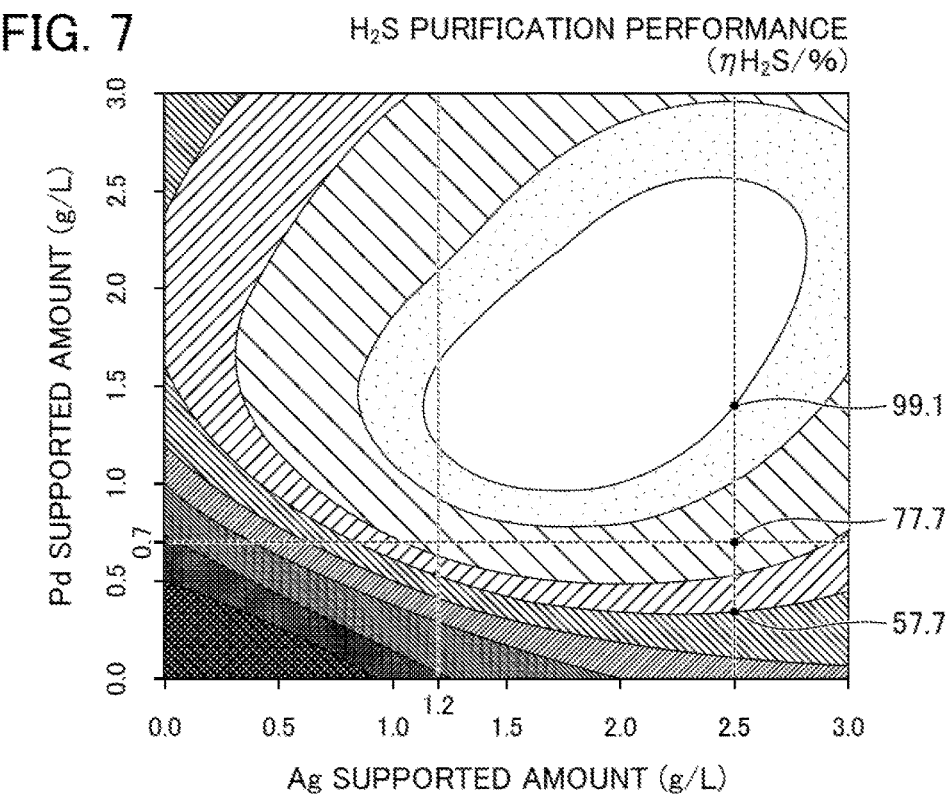
FIG. 7 is a diagram showing a relationship between the Ag supported amount and the Pd supported amount obtained by statistical analysis processing and $H_2S$ purification performance ($\eta H_2S$/%)

FIG. 7 is a diagram showing a relationship between the Ag supported amount and the Pd supported amount obtained by statistical analysis processing and the $H_2S$ purification performance ($\eta H_2S/\%$). Here, $\eta H_2S$ represents a $H_2S$ purification rate. Values in FIG. 7 indicate the $\eta H_2S$ (%), and it is meant that as the region is more lightly colored, the $\eta H_2S$ is increased, and thus the $H_2S$ purification performance is higher. As is clear from FIG. 7, it is found that for example, when a case of Ag/Pd=0.5 (g/L)/0.5 (g/L) and a case of Ag/Pd=2.5 (g/L)/2.5 (g/L) are compared, though the Ag/Pd ratio is the same so as to be 1.0, if the amounts of Ag and Pd supported are excessively low, the $H_2S$ purification performance is extremely lowered. In other words, it is found from FIG. 7 that although the Ag/Pd ratio is optimized so as to enhance the $H_2S$ purification performance, a given amount supported or more is needed.

A method of manufacturing the PM combustion catalyst according to the present embodiment will then be described in detail. First, an aqueous solution of silver nitrate containing Ag ions and for example, an aqueous solution of palladium nitrate containing Pd ions are impregnated into the $Al_2O_3$ carrier such that the Ag supported amount is 1.2 to 2.5 g/L, that the Pd supported amount is equal to or less than 0.7 g/L and that the Ag/Pd ratio falls within a range of 1.7 to 8.3. Then, for example, they are evaporated to dryness at 120 to 150° C. and are then calcined in air at 800±100° C. for 20±10 hours, and thus Ag and Pd are reliably alloyed. In this way, it is possible to obtain the powder of the PM combustion catalyst according to present embodiment.

The powder of the PM combustion catalyst according to the present embodiment obtained as described above is mixed with a binder component such as $SiO_2$ or an alumina sol and water if desired, is finely wet-milled with a milling device such as a ball mill so as to form into a slurry, is then coated on the DPF base member and is dried and calcined under predetermined conditions, with the result to obtain the CSF 5.

The total amount of PM combustion catalyst of the present embodiment supported on the DPF base member, that is, the weight of the PM combustion catalyst per unit volume of the DPF base member is preferably 5 to 100 g/L in the case of, for example, a wall flow-type DPF. When the total amount of PM combustion catalyst supported on the DPF base member is less than 5 g/L, sufficient PM purification performance and $H_2S$ purification performance cannot be obtained. When the total amount of PM combustion catalyst supported on the DPF base member exceeds 100 g/L, a back pressure to the exhaust gas is increased, with the result, that this is not desirable. More preferably, the total amount, supported is 10 to 40 g/L.

The present invention is not limited to the embodiment described above, and variations and modifications which can achieve the object of the present invention are included in the present invention. Although in the embodiment described above, the PM combustion catalyst is supported on the DPF provided in the exhaust gas pipe of the diesel engine, there is no limitation to this configuration. For example, the PM combustion catalyst of the present embodiment may be supported on a gasoline particulate filter (GPF) which is provided in the exhaust gas pipe of a gasoline engine. Although in the embodiment described above, the PM combustion catalyst is provided on the downstream side of the NSC, there is no limitation to this configuration. For example, preferably, the PM combustion catalyst is provided on the downstream side of the catalyst in which the S component is adsorbed in a lean atmosphere and in which the adsorbed S component is discharged in a rich atmosphere.

EXAMPLES

Although examples of present invention will then be described, the present invention is not limited to these examples.

Examples 1 to 4 and Comparative Examples 1 to 4

First, an aqueous solution of silver nitrate containing Ag ions and an aqueous solution of palladium nitrate containing Pd ions were impregnated into an $Al_2O_3$ carrier such that the Ag supported amount, the Pd supported amount and the Ag/Pd ratio agreed with values shown in table 1.

Then, they were evaporated to dryness at 120° C. for 30 minutes and were then calcined in air at 800° C. for 20 hours, and thus Ag and Pd were reliably alloyed. In this way, PM combustion catalyst powders in examples 1 to 4 and comparative examples 1 to 4 were obtained.

Then, 180 g of each of the PM combustion catalyst powders obtained as described above, 100 g of an alumina sol (20 weight %) and 320 g of water were mixed and were finely wet-milled with a milling device of a ball mill, with the result that a slurry was prepared. The prepared slurry was applied to a DPF base member made of SiC, was dried at 120° C. for 30 minutes and was then calcined at 800° C. for 20 hours, and thus CSFs in examples 1 to 4 and comparative examples 1 to 4 were obtained. As the DPF base member, a base member was used which was cylindrical, whose diameter was 2.54 cm, whose length was 30 mm and whose capacity was 15 mL. The total amount of individual catalysts supported was set to 30 g/L.

Comparative Example 5

In comparative example 5, the same preparation as described above was performed except that instead of the aqueous solution of silver nitrate containing Ag ions, an aqueous solution of platinum nitrate containing Pt ions was used, and that the Pt supported amount and the Pd supported amount agreed with values shown in table 1, with the result that a PM combustion catalyst and a CSF in comparative example 5 were obtained.

[X-Ray Diffraction Measurement]

Figure 8:
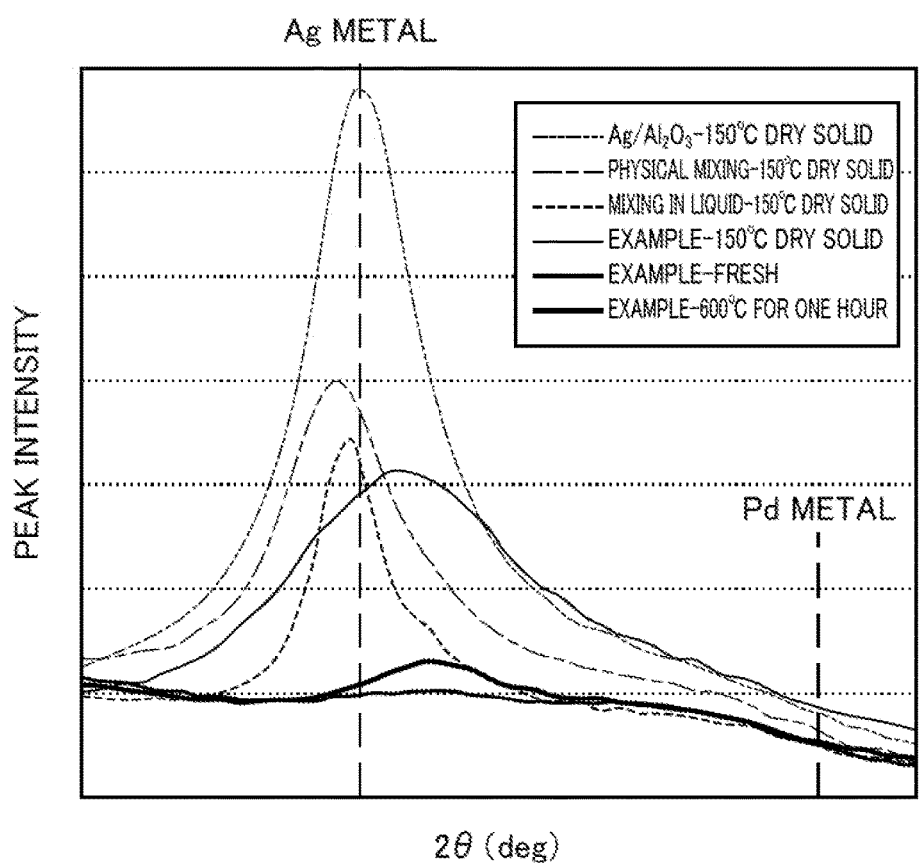
FIG. 8 is an X-ray diffraction spectrum diagram of particulate combustion catalysts according to the present examples.

X-ray diffraction measurements were performed, according to the following measurement conditions, on the PM combustion catalysts obtained in the examples and the comparative examples. The X-ray diffraction spectrums of the PM combustion catalysts according to the present examples obtained by the measurement are shown in FIG. 8.

(X-Ray Diffraction Measurement Conditions)
Device: "Mini Flex600" made by Rigaku.
X-ray source: CuKα
Measurement range: 5 to 80 deg.
Step: 0.02 deg.
Speed: 10 deg./minute

[PM Purification Performance Evaluation]

The PM purification performance of the PM combustion catalysts according to the examples and the comparative examples was evaluated according to the following procedure. First, on the CSFs on which the PM combustion catalyst powders according to the examples and the comparative examples were supported, 3 g/L of PM (in actuality, carbon black serving as a replacement; the same is true in the following description) was deposited, and thereafter a PM purification performance test was performed according to the following test conditions. The amount, of PM burned was calculated from the concentrations of the resulting CO and $CO_2$, and T90 (minute) until the PM combustion rate reached 90% was calculated.

Then, on the CSFs on which the PM combustion catalysts according to the examples and the comparative examples were supported, 6.5 g/L of PM was deposited, and thereafter a PM purification performance test was performed according to the following test conditions. The amount, of PM burned was calculated from the concentrations of the resulting CO and $CO_2$, and T90 (minute) until the PM combustion rate reached 90% was calculated.

Then, a line formula was determined from T90 calculated when 3 g/L of PM was deposited and T90 calculated when 6.5 g/L of PM was deposited, and T90 (minute) when 5 g/L of PM was deposited was calculated from the line formula. The results thereof are shown in table 1 and FIGS. 9 and 10.

(PM Purification Performance Test Conditions)
Test temperature: 550° C.
Aging condition: 750° C. for 16 hours
Gas during heating: $N_2$
Test gas composition: $O_2$=6%, NO=400 ppm, $N_2$=balance gas
Test gas speed: space velocity SV=60000/hour
Measurement time: 30 minutes
Evaluation method: 2-minute burning rate (which was obtained by calculating, as a burning rate, the burned amount for 2 minutes after the start of the reaction from the concentrations of CO and $CO_2$ continuously measured at intervals of 0.1 seconds)

[$H_2S$ Purification Performance Evaluation]

The $H_2S$ purification performance of the PM combustion catalysts according to the examples and the comparative examples was evaluated according to the following procedure. First, on the NSC of the embodiment described above on which Pt was supported, lean/rich control was performed, in a state where the CSF was not installed on the downstream side, under the following test conditions. The lean/rich control was repeatedly performed until the discharge concentration of $H_2S$ from the NSC was stabilized at 300 ppm. The average discharge concentration (ppm) of 5 cycles in which the discharge concentration of $H_2S$ was stabilized at 300 ppm was set to the amount of $H_2S$ supplied to the CSF.

Then, on the downstream side of the NSC, the CSFs according to the examples and the comparative examples were installed, and the lean/rich control was individually performed under the following conditions. The lean/rich control was repeatedly performed until the maximum discharge concentration of $H_2S$ from each of the CSFs was stabilized. The average discharge concentration (ppm) of 5 cycles in which the maximum discharge concentration of $H_2S$ was stabilized was set to the amount of $H_2S$ discharged from each of the CSFs.

Then, the amount, of $H_2S$ supplied to each of the CSFs and the amount of $H_2S$ discharged from each of the CSFs were used, and η$H_2S$ was calculated by formula (1) below. The results thereof are shown in table 1 and FIG. 11.

[formula 1]

$$\eta H_2S\ (\%) = \{(H_2S\ \text{supplied amount} - H_2S\ \text{discharged amount})/H_2S\ \text{supplied amount}\} \times 100 \quad \text{formula (1)}$$

($H_2S$ Purification Performance Test Conditions)
Test temperature: 620° C.
Aging condition: 750° C. for 16 hours
Gas during heating: $N_2$
Lean test gas composition: $O_2$=7%, NO=280 ppm, $CO_2$=10%, $SO_2$=120 ppm, $H_2O$=7%, $N_2$=balance gas
Lean test time: 20 seconds
Rich test gas composition: CO=16000 ppm, $C_3H_6$=10000 ppm, $O_2$=0.33%, NO=280 ppm, $CO_2$=10%, $SO_2$=120 ppm, $H_2O$=7%, $N_2$=balance gas
Rich test time: 10 seconds

TABLE 1

| | Example | | | | Comparative Example | | | | |
|---|---|---|---|---|---|---|---|---|---|
| | 1 | 2 | 3 | 4 | 1 | 2 | 3 | 4 | 5 |
| Ag supported amount (g/L) | 1.2 | 1.2 | 2.5 | 2.5 | 2.5 | 2.5 | 2.5 | 5 | pt = 0.44 |
| Pd supported amount (g/L) | 0.14 | 0.7 | 0.3 | 0.7 | 0 | 1.4 | 2.5 | 0.7 | 0.22 |
| Ag/Pd ratio | 8.3 | 1.7 | 8.3 | 3.6 | ∞ | 1.8 | 1.0 | 7.1 | — |
| T90 (minute) | 12.6 | 9.5 | 9.5 | 9.5 | 19.3 | 9.0 | 9.1 | 9.8 | 12.1 |
| η$H_2S$ (%) | 37.2 | 79.0 | 57.7 | 77.7 | 49.2 | 99.1 | 100 | no | 23.7 |
| Material price ($g/L) | 4.7 | 19.7 | 9.9 | 20.7 | 1.9 | 39.4 | 68.9 | 22.6 | 32.7 |
| PM determination | 2 | 4 | 4 | 4 | 1 | 4 | 4 | 4 | — |

TABLE 1-continued

| | Example | | | | Comparative Example | | | | |
|---|---|---|---|---|---|---|---|---|---|
| | 1 | 2 | 3 | 4 | 1 | 2 | 3 | 4 | 5 |
| $H_2S$ determination | 2 | 4 | 3 | 4 | 3 | 4 | 4 | 4 | — |
| Cost determination | 4 | 3 | 4 | 3 | 4 | 1 | 1 | 3 | — |

Here, the material price in table 1 is a value with assumption that the unit price of Ag is 0.76 $/g, that the unit price of Pt is 60.91 $/g and that the unit price of Pd is 26.79 $/g. The PM determination, the $H_2S$ determination and the cost determination were respectively performed based on T90, $\eta H_2S$ and the material price with the following criteria. In table 1, "no" in a field of $\eta H_2S$ in comparative example 4 means no measurement, and the $H_2S$ determination in comparative example 4 is an estimated value due to the reason which will be described later.

(Criteria)
4: particularly superior to comparative example 5
3: superior to comparative example 5
2: equivalent to comparative example 5
1: inferior to comparative example 5

FIG. 8 is an X-ray diffraction spectrum diagram of the PM combustion catalysts according to the present examples. In FIG. 8, as typical one of the present examples, X-ray diffraction spectrums of the PM combustion catalyst according to example 1 are shown. FIG. 8 shows the X-ray diffraction spectrums of a fresh item (new item), an aged item at 600° C. for one hour and a dry solid item at 150° C. before calcination obtained in the preparation process in the PM combustion catalyst according to example 1. FIG. 8 also shows the X-ray diffraction spectrums of a dry solid item of Ag/Al$_2$O$_3$ where only Ag is supported on the Al$_2$O$_3$ carrier at 150° C. before calcination, a dry solid item obtained by physically mixing Ag and Pd at 150° C. and a dry solid item obtained by mixing Ag and Pd in a liquid at 150° C.

As shown in FIG. 8, the X-ray diffraction peak of the dry solid item of Ag/Al$_2$O$_3$ at 150° C. before calcination is 38.1 degrees whereas the peak of the dry solid item at 150° C. in example 1 is 38.3 degrees. In other words, it is found that in the X-ray diffraction spectrums in the PM combustion catalyst according to example 1, in all the dry solid item at 150° C., the fresh item and the aged item, peaks derived from Ag are shifted to the side of a higher angle than the X-ray diffraction peak of Ag/Al$_2$O$_3$ by 0.1 degrees or more. It is also found that in the X-ray diffraction spectrums in the PM combustion catalyst according to example 1, peaks derived from Pd disappear. This means that Ag and Pd which are the catalyst metals of the PM combustion catalyst according to example 1 are alloyed. Hence, it is confirmed from the results that in the PM combustion catalyst according to example 1, Ag and Pd are alloyed. Since in example 2, the same X-ray diffraction spectrums as in example 1 were obtained, it is confirmed that Ag and Pd are alloyed. When in X-ray diffraction spectrums, sintering (aggregation) does not proceed such that the particle diameter is small, there is a tendency that a peak is unlikely to be observed. Hence, as is clear from FIG. 8, it is found that since in the fresh item and the aged item according to the present, examples, the peaks are significantly small, aggregation does not proceed.

Figure 9:
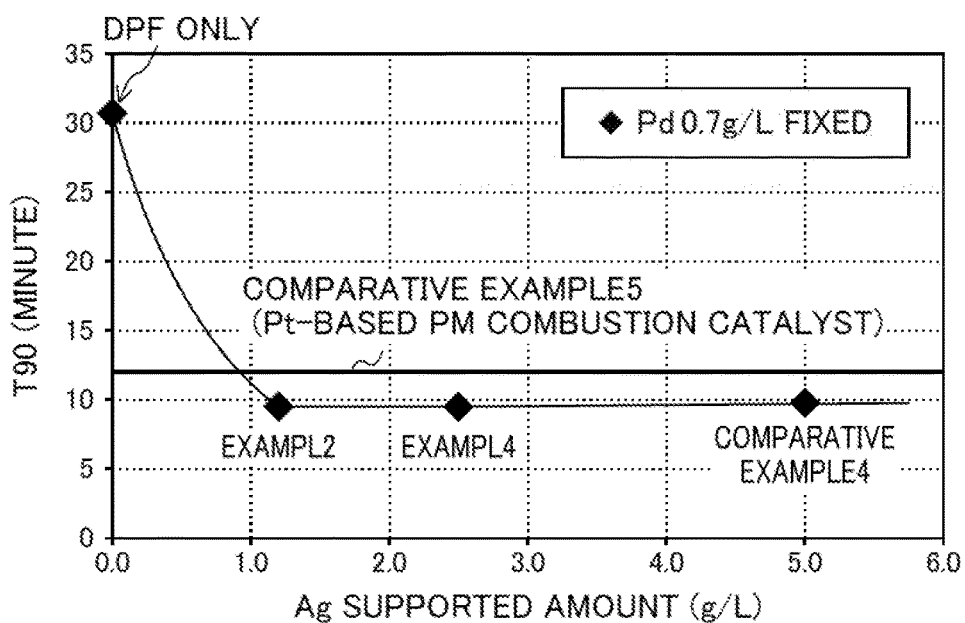
FIG. 9 is a diagram showing a relationship between the Ag supported amount of particulate combustion catalysts according to the present examples and T90.

FIG. 9 is a diagram showing a relationship between the Ag supported amount according to the present examples and the T90. In FIG. 9, the horizontal axis represents the Ag supported amount (g/L), and the vertical axis represents T90 (minute). FIG. 9 shows T90 in examples 2 and 4 and comparative example 4 in each of which the Pd supported amount, is 0.7 g/L. FIG. 9 also shows T90 of the DPF only and T90 in comparative example 5 of a Pt-based PM combustion catalyst. As shown in FIG. 9, it is confirmed that, the PM combustion catalysts of examples 2 and 4 have small T90 and excellent PM purification performance as compared with a conventional Pt-based PM combustion catalyst. It is also found from the results of FIG. 9 that when the Ag supported amount falls below 1.2 g/L (example 2), T90 is rapidly increased whereas when the Ag supported amount is equal to or more than 1.2 g/L, it is possible to obtain excellent PM purification performance. It is also confirmed that with consideration given to the fact, that even when the Ag supported amount, exceeds 2.5 g/L (example 4), the PM purification performance is not further enhanced in vain, the Ag supported amount needs to be set within a range of 1.2 to 2.5 g/L.

Figure 10:
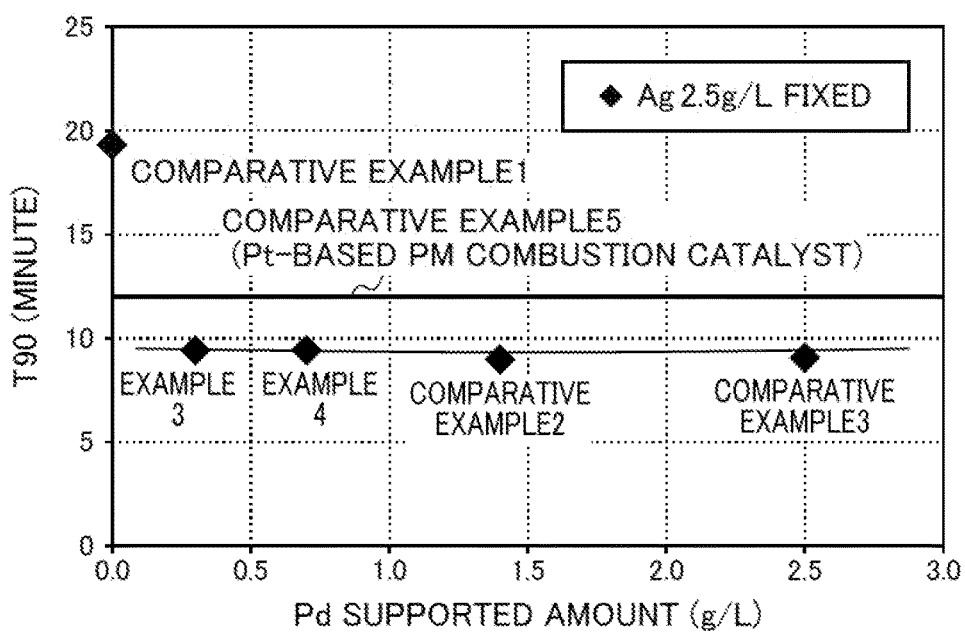
FIG. 10 is a diagram showing a relationship between the Pd supported amount of particulate combustion catalysts according to the present examples and T90.

FIG. 10 is a diagram showing a relationship between the Pd supported amount according to the present examples and T90. In FIG. 10, the horizontal axis represents the Pd supported amount (g/L), and the vertical axis represents T90 (minute). FIG. 10 shows the T90 in examples 3 and 4 and comparative examples 1 to 3 in each of which the Ag supported amount is 2.5 g/L. FIG. 10 also shows T90 in comparative example 5 of the Pt-based PM combustion catalyst. As shown in FIG. 10, it is confirmed that the PM combustion catalysts of examples 3 and 4 have small T90 and excellent PM purification performance as compared with the conventional Pt-based PM combustion catalyst. It is also confirmed from the results of FIG. 10 that with consideration given to the fact that when the Pd supported amount exceeds 0.7 g/L (example 4), the cost is increased, the Pd supported amount needs to be set equal to or less than 0.7 g/L.

Figure 11:
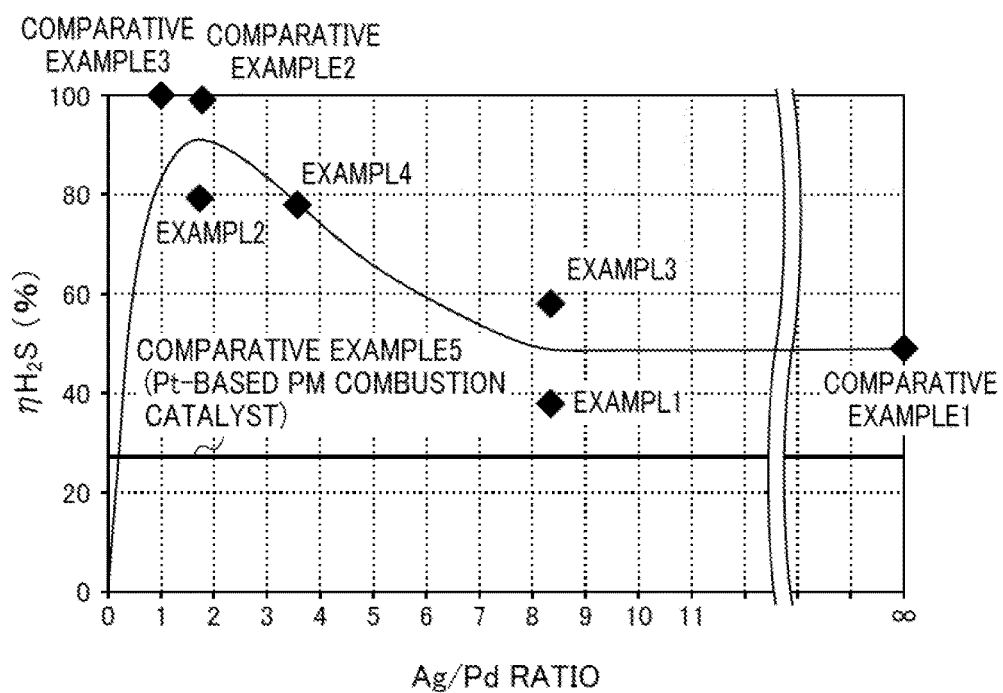
FIG. 11 is a diagram showing a relationship between an Ag/Pd ratio in the PM combustion catalysts according to the present examples and $\eta H_2S$.

FIG. 11 is a diagram showing a relationship between the Ag/Pd ratio in the PM combustion catalysts according to the present examples and $\eta H_2S$. In FIG. 11, the horizontal axis represents the Ag/Pd ratio, and the vertical axis represents $\eta H_2S$ (%). FIG. 11 shows $\eta H_2S$ in the PM combustion catalysts according to examples 1 to 4 and comparative examples 1 to 3. FIG. 11 also shows $\eta H_2S$ in comparative example 5 of the Pt-based PM combustion catalyst. As shown in FIG. 11, it is confirmed that the PM combustion catalysts of examples 1 to 4 have large $\eta H_2S$ and excellent $H_2S$ purification performance as compared with the conventional Pt-based PM combustion catalyst in comparative example 5. It is also confirmed that since when the Ag/Pd ratio falls below 1.7 (example 2), the cost is increased as in comparative examples 2 and 3 whereas when the Ag/Pd ratio exceeds 8.3 (example 3), it is impossible to obtain excellent PM purification performance as in comparative example 1, the Ag/Pd ratio needs to be set within a range of 1.7 to 8.3. Since comparative example 4 corresponds to an example where though $\eta H_2S$ is not measured, the Ag/Pd ratio falls within a range of 1.7 to 8.3, and the amount of Ag in example 4 is only increased, the $H_2S$ purification performance is estimated to be the same as in example 4.

Hence, it is confirmed from the above results that in the PM combustion catalyst according to the present invention in which Ag and Pd are supported on the Al$_2$O$_3$ carrier in a state where Ag and Pd are alloyed, in which the Ag supported amount is 1.2 to 2.5 g/L, in which the Pd supported amount is equal to or less than 0.7 g/L and in which the Ag/Pd ratio is 1.7 to 8.3, it is possible to obtain excellent PM purification performance and excellent H₂S purification performance while reducing the cost.

EXPLANATION OF REFERENCE NUMERALS

1: exhaust gas purification device
2: engine
3: exhaust gas pipe
4: NOx purification unit
5: SCF (exhaust gas purification filter)
7: ECU (reproduction means)

The invention claimed is:

1. An exhaust gas purification device for an internal combustion engine, the exhaust gas purification device comprising:
   a NOx purification unit on which a NOx purification catalyst that is provided in an exhaust passage of the internal combustion engine, that captures, when exhaust gas flowing in is lean, NOx in the exhaust gas and that desorbs the captured NOx when the exhaust gas flowing in is rich so as to reduce and purify the exhaust gas is supported;
   an exhaust gas purification filter on which a particulate combustion catalyst that is provided in the exhaust passage on a downstream side of the NOx purification unit, that captures a particulate in the exhaust gas flowing in and that burns the captured particulate is supported; and
   an electronic control unit configured to perform control so as to enrich the exhaust gas flowing into the NOx purification catalyst and which heats the NOx purification catalyst to a predetermined temperature so as to desorb a sulfur component captured by the NOx purification catalyst,
   wherein the particulate combustion catalyst is supported on an $Al_2O_3$ carrier in a state where Ag and Pd are alloyed,
   an amount of Ag supported on the $Al_2O_3$ carrier is 1.2 to 2.5 g/L,
   an amount of Pd supported on the $Al_2O_3$ carrier is equal to or less than 0.7 g/L and
   a ratio Ag/Pd of the amount of Ag supported to the amount of Pd supported is 1.7 to 8.3.

* * * * *